March 1, 1966 A. K. BERGMANN ETAL 3,238,305

TIME DIVISION MULTIPLEX SYSTEM INCLUDING CIRCUITS FOR TRANSMITTING SIGNALS IN DIFFERENT BAND WIDTHS

Filed May 18, 1961 2 Sheets-Sheet 1

INVENTOR.

ANDERS KARLBY BERGMANN

ANTON CHRISTIAN JACOBAEUS

BY Brown, Jackson, Boettcher & Dienner

TIME DIVISION MULTIPLEX SYSTEM INCLUDING CIRCUITS FOR TRANSMITTING SIGNALS IN DIFFERENT BAND WIDTHS

Filed May 18, 1961 2 Sheets-Sheet 2

INVENTOR.
ANDERS KARLBY BERGMANN
ANTON CHRISTIAN JACOBAEUS
BY Brown, Jackson, Boettcher & Dienner United States Patent Office 3,238,305
Patented Mar. 1, 1966

3,238,305
TIME DIVISION MULTIPLEX SYSTEM INCLUDING CIRCUITS FOR TRANSMITTING SIGNALS IN DIFFERENT BAND WIDTHS

Anders Karlby Bergmann, Galion, Ohio, and Anton Christian Jacobaeus, Stockholm, Sweden, assignors to North Electric Company, Galion, Ohio, a corporation of Ohio Filed May 18, 1961, Ser. No. 110,990
9 Claims. (Cl. 179—15)

The present invention relates to transmission circuits, and particularly to a novel transmission system in which time division switching is used to provide a number of messages simultaneously over a common path or highway.

In recent developments in the transmission field, it has been found that many operating advantages may be obtained in the use of a swtiching network which is based on time division switching techniques. Some of the advantages include a more expeditious extension of connections between substations of the system, a substantial reduction in the number of switching paths and transmission facilities, and improved reliability and service in severe environmental conditions.

One of the basic concepts of time division switching involves the use of one path or highway to simultaneously transmit a plurality of discrete sets of information by time sharing of the path. In achieving such division or sharing of a path, the sources of each of the information sets to be transmitted are sampled in rapid sequence by high speed switching devices, the sampling being so brief that only a small increment of each intelligence set is coupled to the path during each sampling. The small increments sampled from each source in such manner are coupled to the highway at succesive and discretely different time intervals.

The speed of sampling of the intelligence connected to a highway is at least partially determined by the band width characteristic of the waveforms which are coupled over the input circuits. In the use of such mode of operation in a telephone exchange, for example, the characteristic band width for speech waveforms of a subscriber is for practical purposes considered to be between zero and 4000 cycles per second. It has been determined that the signals or waveforms within a band width of 4 kc. are desirably sampled at the rate of at least 8 kc. to effect satisfactory reconstruction of intelligible signals at the output end. Sampling of the speech waveform at a higher rate provides improved fidelity in reconstruction, and in different embodiments requiring higher fidelity sampling is therefore performed at higher rates such as 10, 12, 12.5 kc., etc. The use of a higher rate, however, is not alone the solution since the higher rate of sampling necessarily reduces the number of sources which may be sampled in a given time interval, and it is customary therefore to consider both the degree of fidelity and the number of samplings which are best suited for the given application.

In an embodiment in which intelligence is to be sampled at the 12.5 kc. rate, the amount of time available for sampling of each of the different ones of the intelligence sets on the highway will be $$\frac{1,000,000}{12,500}$$

microseconds or 80 microseconds, which is designated herein as a frame or cycle. Assuming that 24 different sets of intelligence are to be transmitted in each such period (or frame), each sampling interval (or time slot) in a frame will have a maximum duration of 3⅓ microseconds. Further, the pulse period of each time slot will be approximately 50% of the period or 1.67 microseconds, and the space period will be of similar duration.

For purposes of explanation, therefore, the arrangement of the present disclosure will be assumed to have frame periods which are 80 microseconds in duration, and twenty-four time slots available for use in transmitting twenty-four discrete sets of information (if desired) over a single path, the sets being sampled at a frequency rate of 12.5 kc. whereby a different set is sampled every 3⅓ microseconds.

The concepts of time division switching as utilized in an automatic telephone exchange including a highway type switching communication path have been set forth in the copending application having Serial No. 816,180, which was filed by A. K. Bergmann et al. on May 27, 1959, and which has now issued as U.S. Patent 3,088,998. Such concepts have also been disclosed in the article entitled "Electronic Telephone Exchangers" published in the Ericson Review, Volume 1, 1956, and reference is made to such application and publication for the details of the manner of operation of a telephone exchange which uses such concepts.

As noted above, the speed at which the information of the different sources is sampled, is desirably related to the bandwidth characteristics of the information at the source, and for such reason the speech waveforms of telephone substations (each of which is a source of intelligence in a telephone exchange, and each of which is considered for practical purposes as having a bandwidth characteristic of approximately 0–4 kc.) may be sampled in one embodiment at a 12.5 kc. rate. It has now become apparent in the field that there is a definite need for a time division multiplex switching arrangement which, in addition to transmitting signals having a bandwidth of 0–4 kc., is also capable of transmitting signals having a bandwidth of a substantially higher value (such as data having a band width of 0–12 kc., for example), and more specifically for a system which is capable of transmitting signals of both the lower and higher band width characteristics over a single highway on a time division basis.

It is an object of the present invention therefore to provide a system which transmits signals having higher band width characteristics over a common highway on a time division basis with signals of a lower band width characteristic while yet providing intelligible information at the remote end of the highway transmission system.

It is a further object of the invention to provide a novel method of transmitting signals of a higher band width characteristic over a common highway on a time division basic with signals of a lower band width.

It is an additional object of the invention to provide a novel switching system which includes transmission paths of a first group for use in transmitting signals in a first predetermined band width, and a time division switching network including means for establishing connections over said transmission paths for equipment of a first class, the paths in different connections being assigned different time slots of a repetitive cycle for transmission of signals thereover, and a second group of transmission paths for use in establishing connections between a second class of equipment, each of which paths has a band width which is wider than said first band width, and includes input means, sampling means for sampling the information on said input means at "$n$" equally spaced time slots in each cycle, storage means for storing the information sampled by the gates on a time division basis in each cycle, and transfer gates for transferring the information on said storage means at random idle time slots to a second like path in the connection, and means for operating the sampling gates and transfer gates in the second path in the connection at times in the cycle simultaneously with the corresponding gates in the first path in the connection, whereby the information coupled to the input end of one path of a connection for said second class of equipment appears at the output end of a second path in the connection after the expiration of one cycle.

Such arrangement as included in an automatic telephone system permits the transmission of signals of a higher band width over a switching network which has highways and paths adapted to transmit signals of a lower band width, and thereby permits the expansion of service provided by an existing exchange without extensive modification of the existing equipment. The increased flexibility provided by such arrangement is considered to be an important feature of the invention.

These and other features of the invention believed to be new will be apparent with reference to the following specifications, claims and drawings in which:

*General description*

As indicated above, the novel switching network is operative to establish a transmission path over a highway on a time division basis between substations of a first class which have a band width of a lower order, and to establish a transmission path over the same highway for substations of a second class which have a band width of a higher order.

Figure 1:
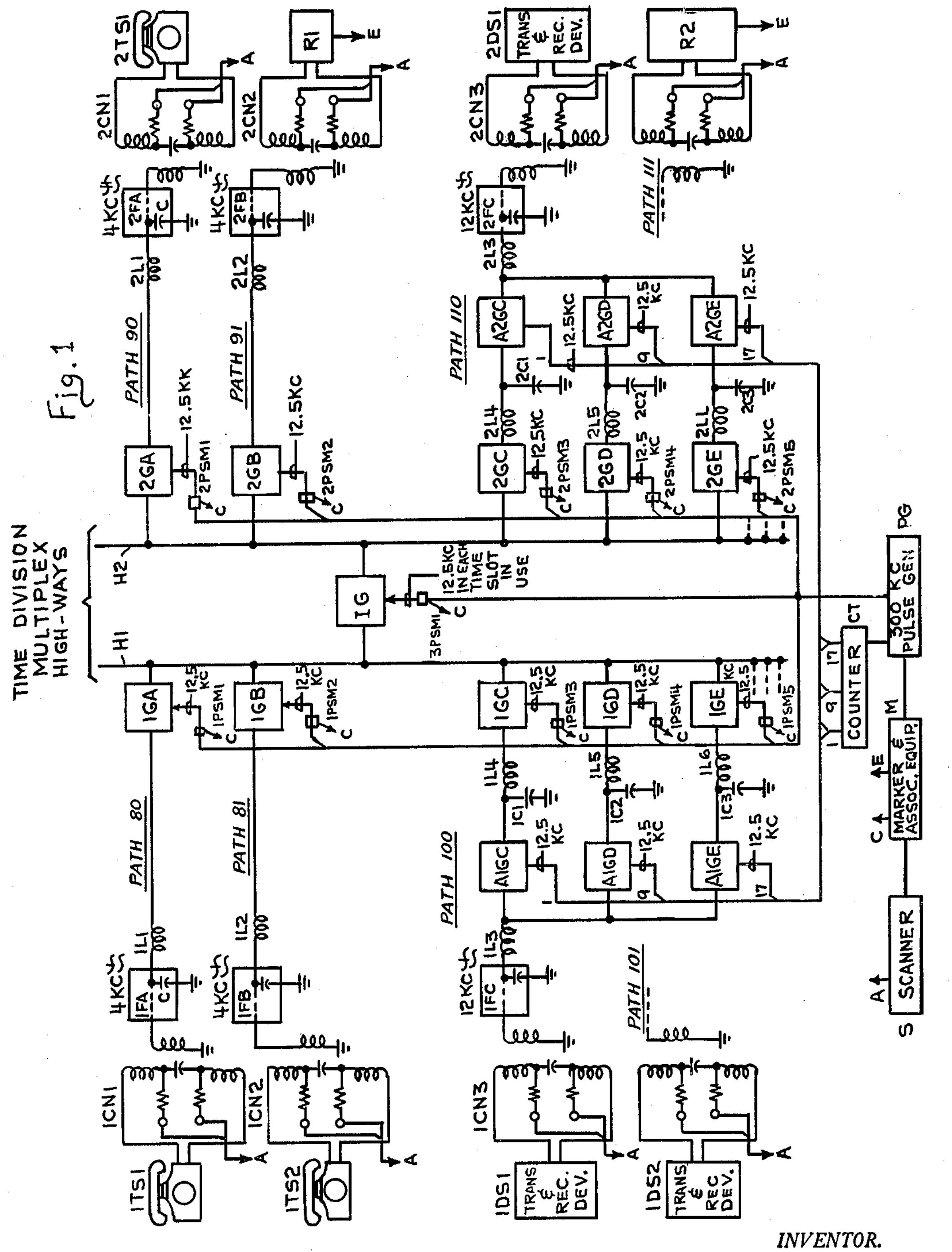
FIG. 1 is an illustration of a switching network including the switching members for establishing the transmission of signals of a different band width over common switching paths.

The novel network as schematically shown in FIGURE 1 includes a first highway H1 having a plurality of telephone substation devices, such as ITS1, ITS2 connected thereto, each substation being connected to the highway over a path such as 80, 81 having a band pass characteristic in the order of 0–4 kc. A plurality of data substation devices of a second class (such as illustrated substation 1DS1, 1DS2) are connected to highway H1 over paths, such as 100, 101 which have a band width in the order of 0–12 kc. A second highway H2 has a plurality of telephone substations of the first class (such as illustrated substation 2TS1) connected thereto over a path, such as 90, having a band width of approximately 0–4 kc.; a first group of registers, such as illustrated register R1, connected thereto over a path, such as 91, having a band width of approximately 0–4 kc.; a plurality of data substation devices of the second class of transmission circuits, such as illustrated data substation 2DS1, connected thereto over paths, such as 110, having a band width of approximately 0–12 kc. and a second group of registers, such as illustrated register R2 connected thereto over paths, such as 111, having a band width of 0–12 kc. Highways H1 and H2 are connected to each other by interhighway gate IG.

The 0–4 kc. paths 80, 81, 90, 91 for connecting the substation devices, such as 1TSL, 1TS2, 2TS1 and register devices such as R1, etc. (which are associated with the lower band width transmission path) to highways H1, H2, respectively, each include a coupling network, such as 1CN1, a low pass filter, such as 1FA (which is designed to pass frequencies of from 0–4 kc.) and a gate, such as 1GA.

Figures 2, 3:
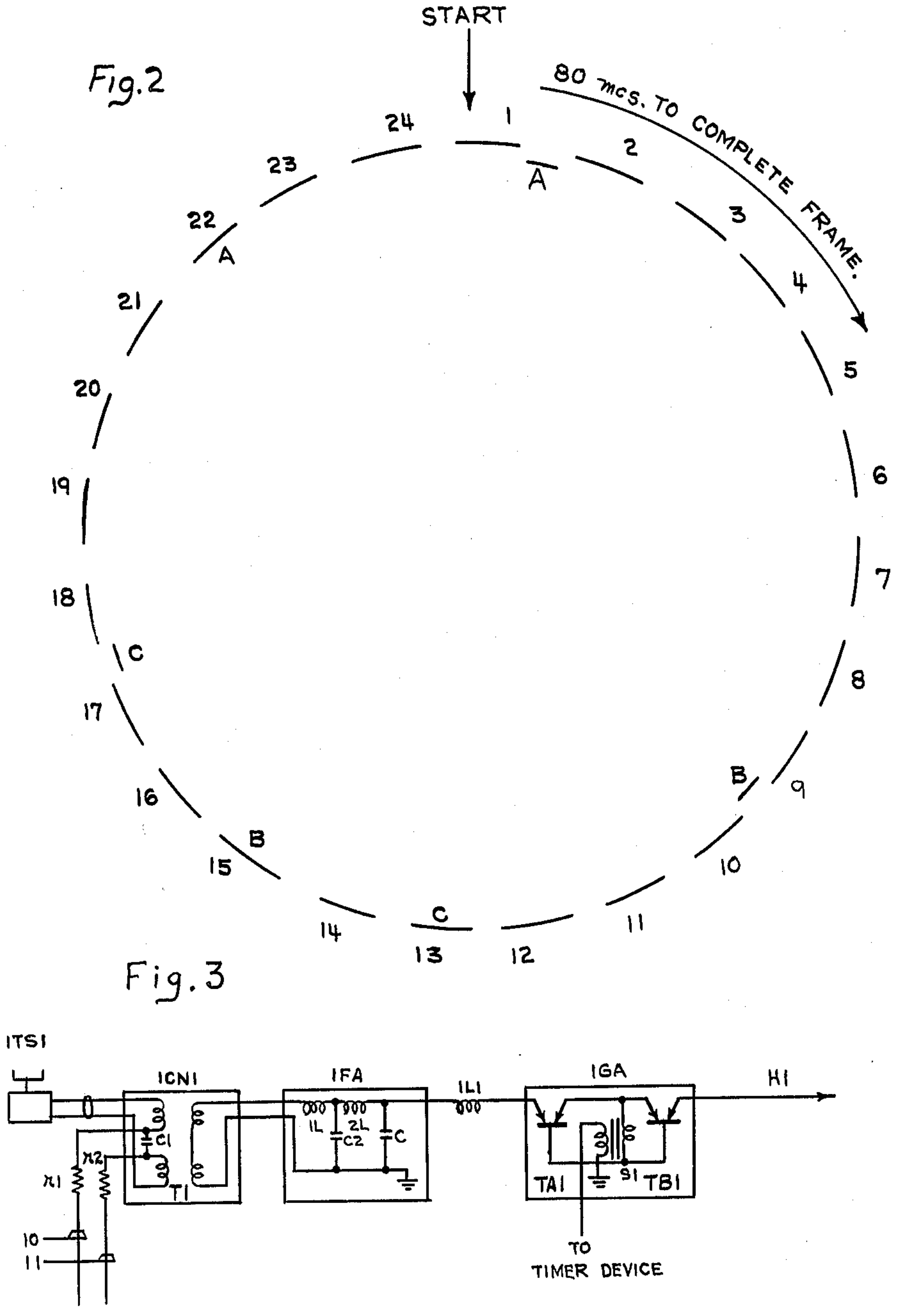
FIG. 2 is a diagram of the time cycle which may be used with one embodiment of the invention.
FIG. 3 is a detailed illustration of the components in certain of the paths for the system.

The components in a transmission path such as 80 for a subscriber of the first class are illustrated in detail in FIGURE 3, and as there shown, the coupling network 1CN1 basically comprises a four winding transformer T1 connected between the substation 1TS1 and the filter 1FA, one outer terminal of each of the two primary windings being connected to the substation 1TS1 and the second terminal of each primary winding being connected over resistor *r1*, *r2*, and conductors 10, 12 to a marking core in the scanner S. Capacitor C1 is coupled between the two portions of the primary.

Filter 1FA comprises a 4 kc. filter of a configuration including inductances 1L, 2L and capacitance C2, C. An inductance 1L1 is connected between filter 1FA and gate 1GA.

Each switching gate, such as 1GA, includes a first and second transistor TA1 and TB1 connected between the input circuit and output circuit of the gate and a transformer S1 having its secondary winding connected across the control circuit for the transistor devices TA1, TB1 to control the opening and closing thereof. Transistor devices TA1, TB1 are of the bilateral junction type, and include an emitter element, a collector element, and a base element. The collector of transistor TA1 is connected to inductance 1L1, and the emitter elements of transistors TA1 and TB1 are interconnected. The collector of transistor TB1 is connected to the highway H1. The secondary winding of transformer S1 is connected in the base circuits of transistors TA1, TB1 and the primary winding is coupled to the output circuit of a timer device, which may be a pulse shaper and memory circuit 1PSM1 such as described in more detail in the above identified application.

In applications other than automatic telephone systems, the time device may comprise any well known timing circuit which provides a pulse at one discrete time slot, at least, and which may be synced with the other timer devices in the system to the time slots of a repetitive cycle generated by the system pulse generator.

In the present embodiment, each switching gate in the lower band width transmission circuit, such as 1GA–1GB, 2GA–2GB has a timer or pulse shaper and memory circuit, such as 1PSM1–1PSM2, 3PSM1, 2PSM1–2PSM2 connected to control the opening and closing of the switching gates. The pulse shaper and memory circuits, such as 1PSM1, are in turn connected to a 300 kc. system pulse generator PG, and to a marker M (as indicated by path C) for control thereby. The pulse generator PG is operative continually to provide pulses in a cyclic manner at the 300 kc. rate over the coupling paths to each of the pulseshaper and memory circuits, such as 1PSM1, associated with each gate, such as 1GA, the output pulses being divided into frames of 80 microseconds, and each frame being divided into twenty-four time slots of 3⅓ microseconds each. In assigning a path, such as 80, for use in a connection, the marker equipment M conditions the pulse shaper and memory circuit, such as 1PMS1, associated with the path gate, such as 1GA, to operate the gate during a particular one of the time slots in each frame.

As an example, in the establishment of a call by a party, such as 1TS1, to a substation such as 2TS1, if the marker determines that time slot sixteen is available for use, the marker M will transmit such indication to the pulse shaper and memory devices 1PSM1, 2PSM1 and 3PSM1 for the gates 1GA, 2GA, 1G to be used in the connection which is being established. Each of the pulse shaper and memory devices, such as 1PSM1, which is thus conditioned is then operative to complete a circuit over its associated gate, such as 1GA, whenever (and only whenever) time slot sixteen of each frame is generated by the 300 kc. pulse generator PG.

The 0–12 kc. paths, such as 100, 101, 110, 111, etc., for connecting the data substation devices, such as 1DS1, 1DS2, 2DS1, and registers, such as R2, to the highways H1, H2 each include a coupling network, such as 1CN3, a low pass filter, such as 1FC (which is designed to pass frequencies in the range of 0–12 kc.), an inductance member, such as 1L3, a set of three auxiliary gate circuits, such as A1GC–A1GE, three storage devices, such as 1C1–1C3, and three transfer gates, such as 1GC–1GE. This coupling network 1CN3, the line pass filter 1FC inductor member IL3 and the three transfer gates 1GC–1GE are obvious counterparts of the components in the paths such as 80, 81, etc. for the first group or class of subscriber. Gates A1GC–A1GE may be identical in structure to the gate 1GA–1GE. Auxiliary gates A1GC–A1GE and A2GC–A2GE are connected to and controlled by a counter CT which is, in turn, controlled by the pulse generator PG. As shown in more detail hereinafer, auxiliary gates, such as A1GC–A1GE, are controlled by the pulse generator PG and counter CT to sample the signals of its data substation, such as 1DS1, at uniformly spaced predetermined time slots in a frame (time slots 1, 9, 17 in the disclosed embodiment) each gate being operative at the 12.5 ks. rate. It will be apparent that the information of source 1DS1 is thus in essence sampled at a 37.5 kc. rate, and the information sampled by each auxiliary gate, such as A1GC–A1GE, is stored upon storage devices, such as 1C1–1C3.

Switching or transfer gates 1GC–1GE and 2GC–2GE in the paths, such as 100, 110, for the data substation devices 1DS1, 2DS1 (the higher band width portion of the system) are controlled by pulse shaper and memory devices 1PSM3–1PSM5 and 2PSM3–2PSM5 which are conditioned to operate by the marker M during idle time slots which are determined by the marker M as available for the connection. Gates 1GC–1GE in operation transfer the information stored on storage means 1C1–1C3 on a first path 100 over the highway and a corresponding set of gates, such as 2GC–2GE in a second path 110 to storage means 2C1–2C3 which are associated with a data substation, such as 2DS1.

Marker M is operative to select the idle ones of the time slots for use in the transfer of information from the storage devices 1C1–1C3 to storage means 2C1–2C3, and is specifically operative to assign for such use idle ones of randomly disposed time slots in the frame without regard to the maintenance of a uniform spacing or predetermined sequence of the time slots. In that the gates A2GC–A2GE are operated synchronously with gates A1GC–A1GE when seized for the same connection, the information on capacitor 2C1–2C3 is transferred by auxiliary gates A2GC–A2GE to the data substation 2DS1 exactly one frame after the sampling of the information by the auxiliary gates A1GC–A1GE.

*General operation of time division multiplex system*

In the establishment of call from a telephone substation, such as 1TS1 (a device of the first class having a lower frequency band, which is connected to a first highway H1), to a device of the same class, such as 2TS1, which is connected to a second highway H2, the subscriber initiates the call by removing the handset from the substation in the conventional manner to complete a loop over the coupling network 1CN1. Line scanner S which continuously scans the substation line circuits detects the calling substation (as indicated by the mating arrows A on the coupling network 1CN1 and the scanner S) and couples such information to the marker equipment M. As the marker M receives information from the scanner S as to the identity of the calling line, the marker M immediately assigns a route and a time slot for use in extending the connection to a register, such as R1 by marking the pulse shaper and memory devices PSM of the particular gates associated with the paths and highways which are to be used in such connection. As the assigned time interval or slot is generated by the pulse generator PG in each frame, the pulse shaper and memory devices for the gates which have been selected by the marker are controlled to complete the connection from the subscriber substation 1TS1 over the selected route to the selected one of the registers, such as illustrated register R1.

It will be recalled that in the present arrangement in which a 300 kc. pulse generator is being used, pulses are coupled to each gate at the rate of 12.5 kc. With reference to FIGURE 2, it will be apparent that one frame, which is represented by a clockwise traverse of the circumference of the circle has a duration of 80 microseconds, and that each frame is divided into 24 time slots (each of which is 3⅓ microseconds in duration). Each time slot, in turn, comprises a make period and a break period, the make and break periods being of substantially equal length.

It will be assumed that in the present extension of the connection by subscriber substation 1TS1, marker M has determined that time slot 16 is available for use in the connection, and that the marker has selected the path 80 which extends from substation 1TS1 over coupling network 1CN1, filter 1FA, inductance 1L1, gate 1GA, highway H1, interhighway gate 1G, highway H2 to path 91 which includes gate 2GB, inductance 2L2, filter 2FB, and coupling network 2CN2 to register R1.

It will be recalled that in the present arrangement in which a 300 kc. pulse generator is being used, pulses are coupled to each gate at the rate of 12.5 kc. With reference to FIGURE 2, it will be apparent that one frame, which is represented by a clockwise traverse of the circumference of the circle has a duration of 80 microseconds, and that each frame is divided into 24 time slots (each of which is 3⅓ microseconds in duration). Each time slot, in turn, comprises a make period and a break period, the make and break periods being of substantially equal length.

It will be assumed that in the present extension of the connection by subscriber substation 1TS1, marker M has determined that time slot 16 is available for use in the connection, and that the marker has selected path 80 which extends from substation 1TS1 over coupling network 1CN1, filter 1FA, inductance 1L1, gate 1GA, highway H1, interhighway gate 1G, highway H2 to path 91 which includes gate 2GB, inductance 2L2, filter 2FB, and coupling network 2CN2 to register R1. The marker M therefore conditions the pulse shaper and memory devices 1PSM1, 3PSM1, and 2PSM2 for each of the gates in the path to operate with the occurrence of the pulse period during the sixteenth time slot of each frame. In this manner, the intelligence which originates at the subscriber substation 1TS1 is sampled by the gates at a frequency rate of 12.5 kc. and is coupled over the described path to the register R at such rate.

As the calling subscriber dials the called party number, the gates in the connection transmit sampled segments of the pulse information over the selected route toward the register once each frame (80 microseconds) to register the called number thereat. Register R1 in turn couples the information to the marker M over paths indicated by mating arrows E.

The marker M thereupon releases the register R1 from the connection, and the register extends connections over control gates between the called party and a ringing trunk, and between the calling party and a ring-back trunk, which in turn transmits ringing signals which are projected to both parties. When the called party answers, the marker M interrupts the ringing connections and establishes the transmission paths, as indicated, between the calling and called substations by establishing an available time slot for extending the said connection from the calling party to the called party.

Assuming that the time slot (seven) is available for the connection, and that the connection is to extend from subscriber substation 1TS1 over path 90 which includes coupling network 1CN1, filter 1FA, inductance 1L1, gate 1GA, highway H1, interhighway gate 1G, highway H2, and over path 91 which includes gate 2GA, inductance 2L1, filter 2FA and coupling network 2CN1 to the subscriber substation 2TS1, the marker conditions pulse shaper and memory devices 1PSM1, 3PSM1, 2PSM1 to complete a circuit over their associated gates 1GA, 1G, 2GA during the seventh time slot of each frame which repeats every 80 microseconds. The voice communications of the parties are repeatedly sampled at such rate and in accordance with the time division principles extend the information between the substations.

The extension of the waveform signals from substation 1TS1 to substation 1TS2 is achieved by the resonant transfer principle described in detail in Communication and Electronics, January 1960, pages 949–953, wherein the signals are coupled over the coupling network 1CN1 and the 4 kc. filter 1FA to charge the condenser C in the filter 1FA, so that the value of the varying potential across the condenser C is a representation of the intelligence contained in the signal. When the pulse generator extends the pulses corresponding to the seventh time slot to the pulse shaper and memory devices 1PSM1, 3PSM1, 2PSM1, enabling pulses are fed to gates 1GA, 1G and 2GA to close these gates for a period equal to one-half cycle of the resonant transfer circuit comprising the condenser C of filter 1FA, inductance 1L1, inductance 2L1, and the condenser C′ of filter 2FA. During this time period, the charge of the condenser in filter 1FA is transferred to the condenser in filter 2FA without an appreciable loss (and also from the condenser C′ in filter 2FA to the condenser C in filter 1FA).

Between the transmission of this pulse and the next gating pulse, the condenser C in the filter 1FA once more charges to a value indicative of the information in the signal from the substation 1TS1, and when the pulse generator extends the pulse corresponding to the seventh time slot to pulse shaper and memory devices 1PSM1, 1PSM2 and 2PSM1 during the next frame, the gates are again opened, and the charge on the first condenser C is again transferred to the second condenser C′ in like manner. Thus the amplitude of the 0–4 kc. signal is sampled at the rate of 12½ kc., and is transmitted over the selected route to the low pass filter 2FA associated with the receiving substation 2TS1 for reconstruction and coupling to the substation 2ST1.

A more detailed description of the above described resonant transfer principle which is utilized in the transmission paths is set forth in Haard et al., Patent No. 2,718,621, and the manner in which such principle is operative in the bilateral transmission paths is set forth in the description relating to FIGURE 6 of such patent.

*Description of general operation of equipment for higher bandwidth transmission*

As indicated above, it is desirable in certain installations to include transmitting and receiving devices of a second class which have frequency characteristics and band widths which may be of a higher band width than that of the frequency band width of the equipment of the first class. Since it is normally desirable for purposes of fidelity to sample the information from each source at a rate more than double that of the upper frequency of the band width of the source, the sampling rate for the first class of substations will be of a different value than the sampling rate for the second class of instruments, and it is necessary to provide a novel manner for including devices having a higher band width characteristic on highways which also carry intelligence of devices having a lower band width characteristic.

As shown in FIGURE 1, the information from a source, such as 1DS1, which may be in the range of 0–12 kc. (a range chosen primarily for exemplary purposes, and not to be considered limiting of the scope of the invention), may be transmitted over a switching network which is also operative to transmit information having a frequency range of 0–4 kc. Such manner of transmission is basically accomplished by a second group of transmission paths, such as 100, 101, 110, 111, each of which paths, such as 100, includes a coupling network, such as 1CN3, a low pass filter, such as 1FC (which is designed to pass frequencies in the range of 0–12 kc.), and inductance member, such as 1L3, a set of three gates A1GC–A1GE which are connected in parallel to the filter 1FC, and which are operative to sample the information provided by the signal source 1DS1 at the 12.5 kc. rate at three predetermined, different, uniformly spaced time slots in each frame. The practical result of the three equally spaced samplings in each frame is to provide a sampling speed of 37½ kc. which is a desirable sampling speed for information in signals of the 0–12 kc. bandwidth. As shown in FIGURE 1, the time slots of sampling by gates A1GC–A1GE are preselected by a counter CT which is in turn controlled by the pulse generator PG for the system, and in the disclosed arrangements time slots 1, 9 and 17 have been preassigned to the gates for exemplary purposes.

Each path, such as 100, of said second group of paths 100, 101, 110, 111 further includes a plurality of capacitor means, such as 1C1–1C3, and associated inductance members 1L4–1L6 and the information as sampled by each of the auxiliary gates, such as A1GC–A1GE, in a path such as 100 is stored on the associated capacitors 1C1–1C3 for a period awaiting transfer by three associated transfer gates 1GC–1GE in the path 100 via the time division multiplex highway to another path, such as 110 of the second group. The other path 110 similarly includes transfer gates 2GC–2GE, an associated set of inductance members 2L4–2L6 and storage condeners 2C1–2C3 and sampling gates A2GC–A2GE which are connected over inductance 2L3, filter 2FC and coupling network 2CN3 to the data substation device 2DS1.

The specific operation of the network in effecting the transfer of 0–12 kc. information is now set forth. However, in that the manner in which a connection is set up between subscribers 1TS1 and 2TS1 is known in the art and was set forth in detail above, it is not believed necessary to again detail such portion of the operation of the network. It is accordingly assumed at this time that a connection has been extended to a register, such as R2, which has in turn notified the marker M as to the identity of the called, transmitting and receiving device, such as 2DS1, and that the marker M has ascertained (in the manner indicated heretofore) at least one available route through the switching network and the time slots available for use therewith.

Assuming that the marker M elects to extend the path 100 from the data substation device 1DS1 over the interconnecting components to highway H1, interhighway contact IG, highway H2, the illustrated connecting network and path 110 to data substation device 2DS1, the marker equipment conditions the pulse shaping and memory circuits 1PSM3–1PSM5, 3PSM1 and 2PSM3–2PSM5, to operate at three of the idle ones of the available time slots. It is significant to note that the time slots which are assigned by marker M to the transfer gates 1GC–1GE and 2GC–2GE and 1G for use in the connection are not predetermined (as in the case of the auxiliary gates A1GC–A1GE and A2GC–A2GE) and are not necessarily uniformly spaced in each frame. For purposes of example, it will be assumed that time slots 22, 15 and 13 are available at this time and that marker M assigns time slot 22 to gates 1GC, 1G, and 2GC, time slot 15 to gate 1GD, 1G and 2GD and time slot 13 to gate 1GE, 1G and 2GE.

Marker M in establishing the connection also energizes counter CT to couple pulses to gates A1GC–A1GE and A2GC–A2GE of the two paths 100, 110 in the connection at predetermined, uniformly spaced intervals (which are identified in the present embodiment as the break intervals during time slots 1, 9 and 17). The auxiliary gates A1GC–A1GE and A2GC–A2GE are therefore operated at evenly spaced intervals so that the actual sampling of the transmitted 12 kc. signal, and the actual gating of the 12 kc. signal to the filter 2FC and the data substation 2DS1 is effected at predetermined, uniformly spaced time intervals.

With the conditioning of the auxiliary gates A1GC–A1GE; A2GC–A2GE, and the switching gates 1GC–1GE and 2GC–2GE in such manner, the signals at the data substation source 1DS1 are coupled to the data substation 2DS1. Briefly, each of the auxiliary gates A1GC–A1GE are operative during the uniformly spaced predetermined time slots 1, 9 and 17 in each frame, and since the 12 kc. intelligence of source 1DS1 is thus sampled three times in each frame, the frequency rate of the sampling for the 12 kc. intelligence is 37.5 kc. The information as sampled by the three auxiliary gates A1GC–A1GE is coupled to associated capacitors 1C1–1C3 respectively, and the gates 1GC–1GE, gate IG and gates 2GC–2GE transfer the information from storage capacitors 1C1–1C3 to capacitors 2C1–2C3 during the available time slots, which in the present example were assumed to be 22, 15 and 13, respectively. The gates A2GC–A2GE for the data substation 2DS1 operate in synchronism with the gates A1GC–A1GE at the first data substation 1DS1, and accordingly the information stored on capacitors 2C1–2C3 is coupled to substation 2DS1 exactly one frame period after it was sampled, and in the same uniformly spaced, predetermined time slots (1, 9 and 17 in the present example).

The information is thus sampled and coupled to the substations at uniformly spaced time periods to insure faithful reproduction of the intelligence. Yet the switching network may transfer the information from the path for the one substation 1DS1 to the path for the second substation 2DS1 during any time slots which may be available, whereby it is possible from a practical standpoint to include substations having intelligence at a higher frequency band width in a switching network which is adapted to transmit intelligence at a lower frequency band width.

The manner of intelligence transfer will be more apparent with reference to FIGURE 2 which indicates graphically the times of intelligence transfer effected whenever the marker M has assigned time slot 22 to gate 1GC, time slot 15 to gate 1GD, and time slot 13 to gate 1GE. In the present example, it will be recalled that the intelligence at data substation 1DS1 is coupled over network 1CN3 to the illustrated capacitor in filter 1FC, and counter CT opens the gate A1GC during the open period of time slot 1 to transfer the intelligence from the capacitor in filter 1FC to capacitor 1C1, using the resonant transfer principle.

As indicated above, the time slot twenty-two (22) has been assigned to transfer the information from capacitor 1C1 associated with the transmitting substation to capacitor 2C1 associated with the receiving substation. As time slot twenty-two occurs, the pulse shaper units 1PSM3, 3PSM1 and 2PSM3 close gates 1GC and 1G and 2GC to effect the transfer of the information on capacitor 1C1 over inductance 1L4, gate 1GC, highway H1, gate IG, highway H2, gate 2GC and inductance 2L4 to capacitor 2C1 in the manner of the energy transfer technique described hereinabove.

In the subsequent frame, as the pulse to gate A1GC occurs during the open period of the first time slot (FIGURE 2) further intelligence placed on the capacitor of filter 1FC by data substation 1DS1 is coupled to the capacitor 1C1, and simultaneously the gate A2GC in the path for data substation 2DS1 is also opened to extend the charge on capacitor 2C1 over gate A2GC, and inductance 2L3 to the capacitor in filter 2FC, and the coupling network 2CN3 to the data substation 2DS1. It is thus apparent that each segment of sampled intelligence is coupled to the filter associated with the data substation 2DS1 at predetermined unformly spaced time intervals (1, 9 and 17), each of which intervals is delayed by one frame relative to the time of actual sampling of such information at the data substation 1DS1. It is further noted that the transfer of the information from storage capacitors 1C1–1C3 associated with the data substation 1DS1 to the capacitors 2C1–2C3 associated with the data substation 2DS1 is effected over the time division multiplex highways during any three available time slots which are not predetermined and are not necessarily uniformly spaced relative to each other.

Gate A1GD is operated during each frame by counter CT in a similar manner to effectively transfer intelligence on the capacitor of filter 1FC in the path 100 for data substation 1DS1 to storage capacitor 1C2 in the path 100 for data substation 1DS1 during the open period of the ninth time slot (FIGURE 2), and in the illustated embodiment, gate 1GD, gate IG, and 2GD transfer information which is on storage capacitor 1C2 to storage capacitor 2C2 during the fifteenth time slot of each frame. One frame subsequent to the actual sampling of such information, as gate A1GD operates during the open period of the ninth time slot to couple further information to capacitor 1C2, gate A2GD will be simultaneously operated to effect the coupling of the information on storage capacitor 2C2 to the capacitor in filter 2FC, network 2CN3 and substation 2DS1.

In like manner, the gate A1GE transfers the intelligence on the capacitor of filter 1FC to capacitor 1C3 during the open period of the seventeenth time slot (FIGURE 2) of the frame, and gates 1GE, 1G and 2GE are operated during the thirteenth time slot of the successive frame to transfer the information from storage capacitor 1C3 to storage capacitor 2C3. During the open period of the seventeenth time slot of the frame (exactly one frame subsequent to the actual sampling of the information) gate A1GE is operated to couple further information to capacitor 1C3, and gate A2GE is operated to transfer the information stored on capacitor 2C3 to the capacitor in filter 2FC, network 2CN3 and the substation 2DS1.

It is apparent from the foregoing description that both the transfer of the information between the calling and called party storage units 1C1–1C3 and 2C1–2C3 may be effected at spaced time increments which are not necessarily uniform or predetermined, while yet providing a sampling of the information at the data substation 1DS1, and the distribution of the sampled information at the data substation 2DS1 at uniformaly spaced time increments, whereby faithful reproduction of the intelligence is achieved. Further, the system is operative to effect the transmission of intelligence in a unilateral or bilateral manner. That is, intelligence which is coupled over coupling network 2CN3 to the capacitor on filter 2FC is extended over the same path to the substation 1DS1 by the same components as effected the transmission of the intelligence from substation 1DS1 to 2DS1, and such transmission is effected simultaneously in both directions.

Although the band widths 0–4 and 0–12 were chosen for exemplary purposes, the novel concepts of the invention may obviously be used to effect transmission of intelligence from sources of other different band width characteristics as well.

While what is described is regarded to be a preferred embodiment of the invention, it is apparent that modifications and alterations may be made which include the basic concepts of the invention, and it is intended in the appended claims to cover all such modifications and alterations as may fall within the true spirit and scope of the invention.

What is claimed is:

1. In a communication system having a group of transmission paths, a time division switching network for connecting a first and second one of said paths for use with each other in the establishment of a connection over a common highway means, input means for coupling signals to said first path, a plurality of *"n"* sampling gates connected to each path, timer means connected to said sampling gates for operating the sampling gates in the first path at different time slots in a cycle, corresponding ones of the sampling gates in the second path being operated at the same time in the cycle as the corresponding sampling gate in the first path, a plurality of *"n"* capacitor storage means in each path, means connecting each capacitor storage means of the plurality of storage means in each path to a different sampling gate in the same path to retain the information sampled by its associated sampling gate for an indefinite period, a plurality of "$n$" transfer gates connected in each path, means for operating the "$n$" transfer gates in the first path at different time slots in a cycle selected from said idle time slots, corresponding ones of the "$n$" transfer gates in said first and second paths being operative at the same selected ones of the time slots, and means including said transfer gates in said first and second paths for transferring the information from the capacitor storage means in said first path over said highway to a capacitor storage means in the second path during time slots randomly selected from idle ones of said time slots.

2. A system as set forth in claim 1 which further includes means including the sampling gates in said second path for transferring the information on said second capacitor storage means to a broadband utilization circuit at equally spaced time slots one cycle after storage on said first path.

3. In a system as set forth in claim 1 in which said first and second path includes an inductance member connected wtih each capacitor means between its associated sampling gate and transfer gate to provide a resonant transfer circuit, and in which said second path includes an input means, and said input means in said first and second path each includes a resonant circuit including an inductance and capacitance means.

4. In a communication system having a first group of transmission paths for transmitting signals within a first predetermined bandwidth, and a time division switching network including means for establishing connections over said transmission paths, the paths in different connections being assigned different time slots of a repetitive cycle for transmission purposes, the improvement which comprises: a second group of transmission paths, each path of said second group including input means for receiving signals having a bandwidth which is wider than said first bandwidth, a plurality of sampling means operative to sample said received signals at a plurality of distinct equally spaced time slots of each cycle, including a plurality of sampling gates, a plurality of capacitor means, each of which is associated with a different one of said sampling gates, and each of which is connected to retain for an indefinite period of time the information sampled by its associated gate in such cycle, and transfer means including a plurality of transfer gates, each of which is connected to a different one of said capacitor means for transferring the information on said capacitor means to a further one of said second paths at randomly selected ones of the idle time slots in a cycle.

5. In a communication system having a first group of transmission paths for transmitting signals within a first predetermined bandwidth, and a time division switching network including means for establishing connections over said transmission paths, the paths in different connections being assigned different time slots of a repetitive cycle for transmission of signals thereover, the improvement which comprises: a second group of transmission paths, each path of which has a bandwidth which is wider than said first bandwidth and each path of said second group including input means, a first group of "$n$" sampling gates operative to sample the information received over said input means at a plurality of different distinct evenly spaced time slots in each cycle, a separate capacitor means for each of said sampling gates connected to retain the information sampled by its associated gate in each cycle for an indefinite period of time, and a plurality of transfer gates, each of which is connected to a different one of said capacitor means and said switching network, and means for operating said transfer gates to effect the transfer of the information from its associated capacitor means to said switching network in time slots randomly selected from idle time slots in a cycle.

6. A communication system as set forth in claim 5 in which said time slots are comprised of make and break periods and which system includes timer means connected to said first group of "$n$" sampling gates including means for operating said "$n$" sampling gates during the break period of distinct uniformly spaced time slots in the cycle.

7. A communication system as set forth in claim 5 in which said input means includes an LC resonant circuit connected to effect a resonant transfer of signals from said iput means to said capacitor means.

8. In a communication system as set forth in claim 5 in which "$n$" equals three, and each of said three sampling gates is operated at a different one of three distinct evenly spaced time slots in each cycle, and said transfer gates are three in number each of which is operative at a different one of three distinct, randomly spaced time slots to transfer the information from said capacitor means over said switching network to a second one of said paths in said second group.

9. In a communication system having a first group of transmission paths for use in transmitting signals in a first predetermined bandwidth comprising for equipment of a first class, and a time division switching network including means for establishing connections over said transmission paths for equipment of said first class, the paths of said first group indifferent connections being assigned different time slots of a repetitive cycle for transmission of signals thereover, a second group of transmission paths for use in establishing connections for equipment of a second class, each path of said second group having a bandwidth which is wider than said first bandwidth, and including input means, a plurality of sampling gates for sampling the information on said input means at a plurality of equally spaced time slots in each cycle, separate capacitor means for each sampling gate, each of which capacitor means is connected to retain the information sampled by its respective sampling gate in each cycle for an indefinite period of time, and a separate transfer gate for each capacitor means, each of which is operative to transfer the information on its respective capacitor means at a different random idle time slot over said switching network to another path of said second group in the connection, and means for operating corresponding ones of the sampling gates in said paths of said second group in the connection at the corresponding ones of said equally spaced slots, and corresponding transfer gates in said paths of said second group in the connection at corresponding ones of the randomly selected time slots, whereby the information coupled to the input end of one path of said second group of a connection for said second class equipment appears at the output end of the other path of the second group in the connection in the same time slot one cycle thereafter.

References Cited by the Examiner

UNITED STATES PATENTS

| | | | |
|---|---|---|---|
| Re. 24,679 | 8/1959 | Chubb et al. | 179—18.9 |
| 2,546,935 | 3/1951 | Trevor | 179—15 |
| 2,564,419 | 8/1951 | Bown | 179—15 |
| 2,754,367 | 7/1956 | Levy | 179—15 |
| 2,910,540 | 10/1959 | Van Mierlo et al. | 179—18.9 |
| 2,917,583 | 12/1959 | Burton | 179—15 |
| 2,936,338 | 5/1960 | James et al. | 179—18.9 |
| 3,046,346 | 7/1962 | Kramer | 179—15.55 |

DAVID G. REDINBAUGH, *Primary Examiner.*

ROBERT H. ROSE, *Examiner.*